US00RE42533E

(19) United States
(12) Reissued Patent
Josypenko

(10) Patent Number: US RE42,533 E
(45) Date of Reissued Patent: Jul. 12, 2011

(54) CAPACITATIVELY SHUNTED QUADRIFILAR HELIX ANTENNA

(75) Inventor: Michael J. Josypenko, Norwich, CT (US)

(73) Assignee: The United States of America as represented by the Secretary of the Navy, Washington, DC (US)

(21) Appl. No.: 11/491,534

(22) Filed: Jul. 20, 2006

Related U.S. Patent Documents

Reissue of:
(64) Patent No.: 6,765,541
Issued: Jul. 20, 2004
Appl. No.: 09/558,689
Filed: Apr. 24, 2000

(51) Int. Cl.
*H01Q 1/36* (2006.01)
*H01Q 9/00* (2006.01)

(52) U.S. Cl. ..... 343/895; 343/745; 343/749

(58) Field of Classification Search ..... 343/702, 343/745, 749, 751, 895
See application file for complete search history.

(56) References Cited

U.S. PATENT DOCUMENTS 3,702,481 A 11/1972 Koller et al.
4,554,554 A 11/1985 Olesen et al.
5,485,170 A 1/1996 McCarrick
5,572,172 A 11/1996 Standke et al.
5,635,945 A 6/1997 McConnell et al.
5,701,130 A 12/1997 Thrill et al.
5,721,557 A 2/1998 Wheeler et al.
5,793,338 A 8/1998 Standke et al.
5,828,348 A 10/1998 Tassoudji et al.
5,838,285 A 11/1998 Tay et al.
5,841,407 A * 11/1998 Birnbaum ..... 343/895
5,896,113 A 4/1999 O'Neill, Jr.
6,011,524 A 1/2000 Jervis
6,094,178 A 7/2000 Sanford
6,097,349 A 8/2000 Sanford
6,246,379 B1 6/2001 Josypenko
6,765,541 B1 7/2004 Josypenko

* cited by examiner

*Primary Examiner* — Shih-Chao Chen
(74) *Attorney, Agent, or Firm* — Sterne, Kessler, Goldstein & Fox P.L.L.C.

(57) ABSTRACT

A quadrifilar helix antenna is provided having a feedpoint for the antenna connecting to individual helical antenna elements. A capacitive network, distributed along the length of the antenna, constitutes a variable frequency shunting network. At each position a first capacitive structure, that may comprise a single capacitor or multiple capacitors in series, interconnects a first pair of opposite antenna elements; a second capacitive structure interconnects the second pair of opposite antenna elements. As an applied frequency increases, the capacitive structures progressively short the opposite antenna elements thereby electrically reducing the antenna length.

35 Claims, 10 Drawing Sheets

($Z_o$=200)

CAPACITATIVELY SHUNTED QUADRIFILAR HELIX ANTENNA

Matter enclosed in heavy brackets [ ] appears in the original patent but forms no part of this reissue specification; matter printed in italics indicates the additions made by reissue.

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

U.S. patent Ser. No. 09/356,803 filed Jul. 19, 1999 by the inventor hereof and assigned to the assignee hereof is incorporated herein by reference.

BACKGROUND OF THE INVENTION (1) Field of the Invention

This invention generally relates to antennas and more specifically to quadrifilar antennas.

(2) Description of the Prior Art

Numerous communication networks utilize omnidirectional antenna systems to establish communications between various stations in the network. In some networks one or more stations may be mobile while others may be fixed land-based or satellite stations. Antenna systems that are omnidirectional in a horizontal plane are preferred in such applications because alternative highly directional antenna systems become difficult to apply, particularly at a mobile station that may communicate with both fixed land-based and satellite stations. In such applications it is desirable to provide a horizontally omnidirectional antenna system that is compact yet characterized by a wide bandwidth and a good front-to-back ratio in elevation with either horizontal or vertical polarization.

Some prior art omnidirectional antenna systems use an end fed quadrifilar helix antenna for satellite communication and a co-mounted dipole antenna for land based communications. However, each antenna has a limited bandwidth. Collectively their performance can be dependent upon antenna position relative to a ground plane. The dipole antenna has no front-to-back ratio and thus its performance can be severely degraded by heavy reflections when the antenna is mounted on a ship, particularly over low elevation angles. These co-mounted antennas also have spatial requirements that can limit their use in confined areas aboard ships or similar mobile stations.

The following patents disclose helical antennas that exhibit some, but not all, the previously described desirable characteristics:

U.S. Pat. No. 5,485,170 (1996) to McCarrick discloses a mobile satellite communications system (SMAT) mast antenna with reduced frequency scanning for mobile use in accessing stationary geosynchronous and/or geostable satellites. The antenna includes a multi-turn quadrifilar helix antenna that is fed in phase rotation at its base and is provided with a pitch and/or diameter adjustment for the helix elements, causing beam scanning in the elevation plane while remaining relatively omni-directional in azimuth. The antenna diameter and helical pitch are optimized to reduce the frequency scanning effect, and a technique is disclosed for aiming the antenna to compensate for any remaining frequency scanning effect.

U.S. Pat. No. 5,701,130 (1997) to Thill et al. discloses a self phased antenna element with a dielectric. The antenna element has two pairs of arms in a crossed relationship to transceive a signal at a resonant frequency. A dielectric is disposed adjacent an arm to obtain a self phased relationship in the arms at the resonant frequency. The arms can form crossed loops or twisted crossed loops such as a quadrifilar helix antenna element. A dielectric collar on arms of the same loop causes currents to be equally spaced from one another. The antenna size is reduced and a cross section of the antenna element appears circular without degradation of a gain pattern when the dielectric is used on a certain arm.

In U.S. Pat. No. 5,721,557 (1998) Wheeler et al. disclose a nonsquinting end-fed quadrifilar helix antenna. Each conductor of the antenna is fed with a successively delayed phase representation of the input signal to optimize transmission characteristics. Each of the conductors is separated into a number, Z, of discrete conductor portions by Z−1 capacitive discontinuities. The addition of the capacitive discontinuities results in the formation of an antenna array. The end result of the antenna array is a quadrifilar helix antenna which is nonsquinting, that is, the antenna radiates in a given direction independently of frequency.

There exists a family of quadrifilar helixes that are broadband impedance wise above a certain "cut-in" frequency, and thus are useful for wideband satellite communications including Demand Assigned Multiple Access (DAMA) UHF functions in the range of 240 to 320 MHz and for other satellite communications functions in the range of 320 to 410 MHz). Typically these antennas have (1) a pitch angle of the elements on the helix cylindrical surface from 50 down to roughly 20 degrees, (2) elements that are at least roughly ¾ wavelengths long, and (3) a "cut-in" frequency roughly corresponding to a frequency at which a wavelength is twice the length of one turn of the antenna element. This dependence changes with pitch angle. Above the "cut-in" frequency, the helix has an approximately flat VSWR around 2:1 or less (about the $Z_0$ value of the antenna). Thus the antenna is broadband impedance-wise above the cut-in frequency. The previous three dimensions translate into a helix diameter of 0.1 to 0.2 wavelengths at the cut-in frequency.

For pitch angles of approximately 30° to 50°, such antennas provide good cardioid shaped patterns for satellite communications. Good circular polarization exists down to the horizon since the antenna is greater than 1.5 wavelengths long (2 elements constitute one array of the dual array, quadrifilar antenna) and is at least one turn. At the cut-in frequency, lower angled helixes have sharper patterns. As frequency increases, patterns start to flatten overhead and spread out near the horizon and small nulls start to form overhead. For a given satellite band to be covered, a tradeoff can be chosen on how sharp the pattern is allowed to be at the bottom of the band and how much it can be spread out by the time the top of the band is reached. This tradeoff is made by choosing where the band should start relative to the cut-in frequency and the pitch angle.

For optimum front-to-back ratio performance, the bottom of the band should start at the cut-in frequency. This is because, for a given element thickness, backside radiation increases with frequency (the front-to-back ratio decreases with frequency). This decrease of front-to-back ratio with frequency limits the antenna immunity to multipath nulling effects.

Other factors that influence the front-to-back ratio include the method of feeding the antenna, the physical size of antenna elements, the dielectric loading of the antenna elements and the termination of the antenna elements. Looking first at antenna feeding, the front-to-back ratio improves when an antenna is fed in a "backfire mode" such that the antenna feed point is at the top of a vertically oriented antenna, as opposed to a "forward fire mode" when the feed point is at the bottom of the antenna.

Thinner elements increase the front-to-back ratio. However, as the elements become thinner, the input impedance to the antenna increases and introduces a requirement for impedance matching. Alternatively, lower impedances can be obtained by constructing an antenna with a partial overlap of the antenna elements to increase capacitance. However, a loss of impedance bandwidth starts to occur since the capacitance is a non-radiating capacitance; that is, no radiation can occur from the overlapped areas of the antenna.

Increasing the dielectric loading of the helix elements decreases the front-to-back ratio. Wide flat elements found in many helix antennas have a pronounced loading if one side of each antenna element touches a dielectric, as in the case where the dielectric is a support cylinder for the antenna. If the gap between adjacent elements is small, the field is strongly concentrated in the gap and any dielectric in the gap will load the antenna strongly. Quadrifilar helix antennas can terminate with open or shorted ends remote from the feed point. It has been found that antennas with open ends have a slightly higher front-to-back ratio than do antennas with shorted ends.

My above-identified pending U.S. patent Ser. No. 08/356,803 discloses an antenna having four constant-width antenna elements wrapped about the periphery of a cylindrical support. This construction provides a broadband antenna with a bandwidth of 240 to at least 400 MHz and with an input impedance in a normal range, e.g., 100 ohms. This antenna also exhibits a good front-to-back ratio in both open-ended and shorted configurations. In this antenna, each antenna element has a width corresponding to about 95% of the available width for that element. However, it was found that this antenna could require a tradeoff between the pattern shapes in the transmit and receive bands. It became necessary to allow patterns at lower receive frequencies to become sharper overhead than desired. At higher transmit frequencies, it became necessary to accept overhead patterns that were flatter overhead than desired. At even higher frequencies, nulls were observed in the patterns because the element lengths were becoming long enough electrically for multilobing to begin.

SUMMARY OF THE INVENTION

Therefore it is an object of this invention to provide a broadband unidirectional hemispherical coverage radio frequency antenna.

Another object of this invention is to provide a broadband unidirectional hemispherical coverage antenna with good front-to-back ratio over a range of frequencies.

Yet still another object of this invention is to provide a broadband unidirectional hemispherical coverage antenna that operates with a circular polarization and that exhibits a good front-to-back ratio.

Yet still another object of this invention is to provide a broadband unidirectional hemispherical coverage antenna that provides an essentially constant radiation pattern over a range of frequencies.

In accordance with this invention the above objects are achieved by an antenna that extends along an antenna axis between a feed end and an other end and that carries a plurality of pairs of diametrically opposed antenna elements wrapped helically about the support. Each antenna element has a length determined by a cut-in frequency. A capacitive network spans the antenna elements in each pair at corresponding predetermined positions from the other end for shorting the pairs of antenna elements at a characteristic frequency greater than the cut-in frequency.

In accordance with another aspect of this invention, a quadrifilar helix antenna operates over a frequency bandwidth defined by a minimum operating frequency and extends along an antenna axis between first and second ends of the antenna. Four equiangularly spaced helical antenna elements extend along the support between the first and second end, each antenna element has a length of at least ¾ wavelength at the minimum antenna operating frequency and has a substantially constant thickness and width along its length. Each diametrically opposed set of elements constitutes an element pair whereby the antenna has first and second pairs of antenna elements. A plurality of sets of capacitive elements connect between the antenna elements in each pair, each set being connected at a different position along the antenna axis and each capacitive element in a set connected to said respective antenna element pair at the same position along the antenna axis.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
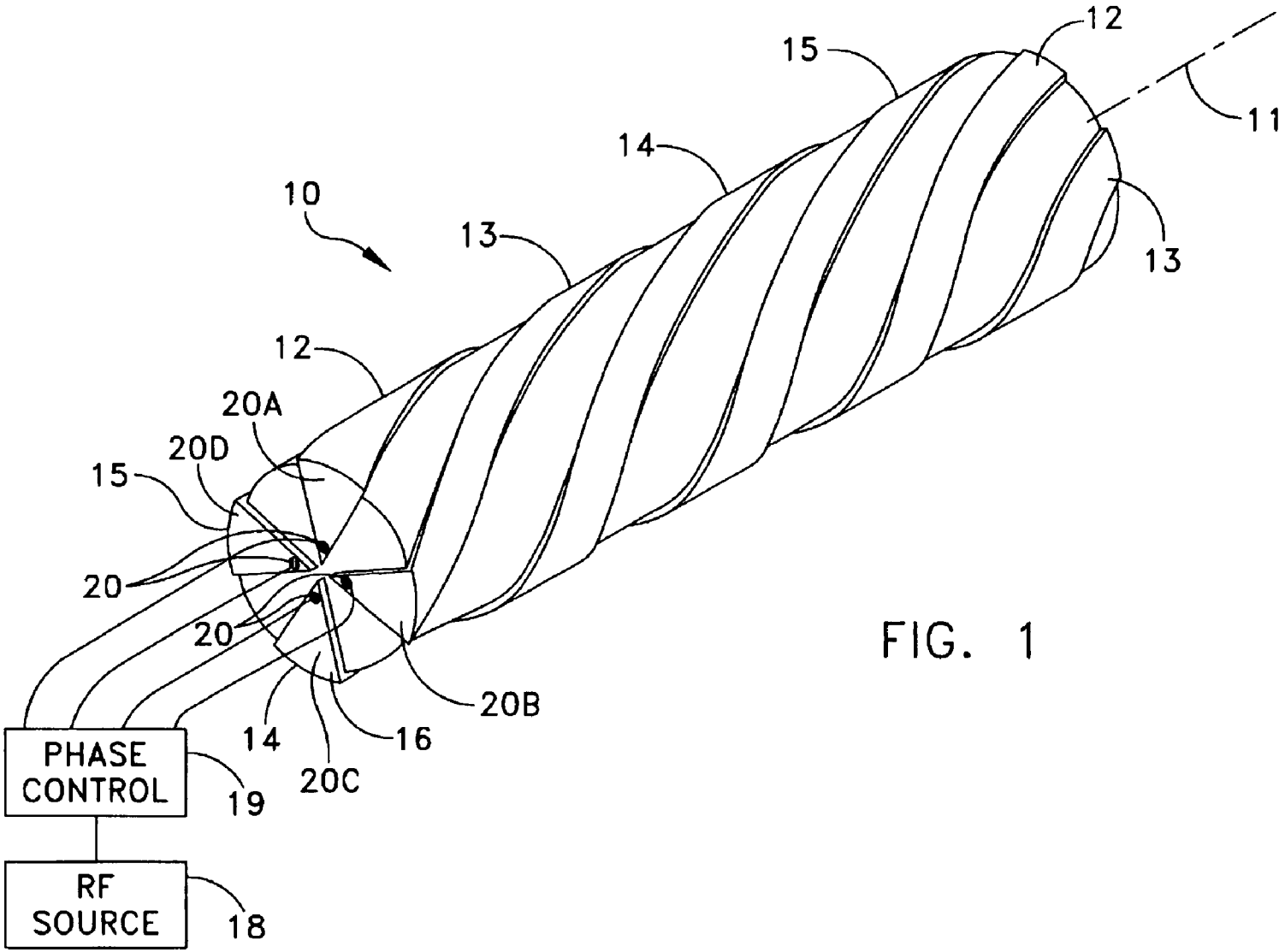
FIG. 1 is a perspective view of one embodiment of a quadrifilar helix antenna constructed in accordance with this invention.

In FIG. 1, a quadrifilar helix antenna 10, constructed in accordance with this invention extends along a longitudinal axis 11. Four antenna elements 12, 13, 14 and 15 wrap helically about this longitudinal axis 11 and extend from a feed or first end portion 16 to an unfed or second end portion 17. The antenna element 12 and identical antenna elements 13, 14 and 15 are wrapped as spaced helices about the axis 11. FIG. 1 depicts the antenna elements 12 through 15 as being wrapped on a form for facilitating an understanding of the antenna construction. This form could be eliminated with the antenna elements being self-supporting.

Still referring to FIG. 1, an rf source 18 and a phase control 19 drive the antenna 10 at a plurality of feedpoints 20 proximate the axis 11 at the first end 16. A series of radially extending conductive paths 20A, 20B, 20C and 20D couple the central feed points 20 to each of the helically wrapped elements 12 through 15, respectively. The signals applied to these feedpoints are in phase quadrature. In one form, an RF signal from the rf source 18 is applied to a 90° power splitter with a dump port terminated in a characteristic impedance, $Z_0$. The two outputs of the 90° power splitter connect to the inputs of two 180° degree power splitters thereby to provide the quadrature phase relationship among the signals on adjacent ones of the antenna elements 12 through 15. It is known that swapping the output cables of the 90° power splitter will cause the antenna to transfer between backfire and forward radiation modes.

An antenna constructed in accordance with this invention achieves pattern stability by making the antenna elements in FIG. 1 become electrically shorter with increasing frequency without altering the physical length of any of the antenna elements 12 through 15. Specifically, successive sections of the helix are shorted electrically progressively from the unfed end as frequency increases from the cut-in frequency by means of a capacitive shorting network. Obviously, a limit occurs when the helix is so short as to no longer operate as a helix.

Figure 2:
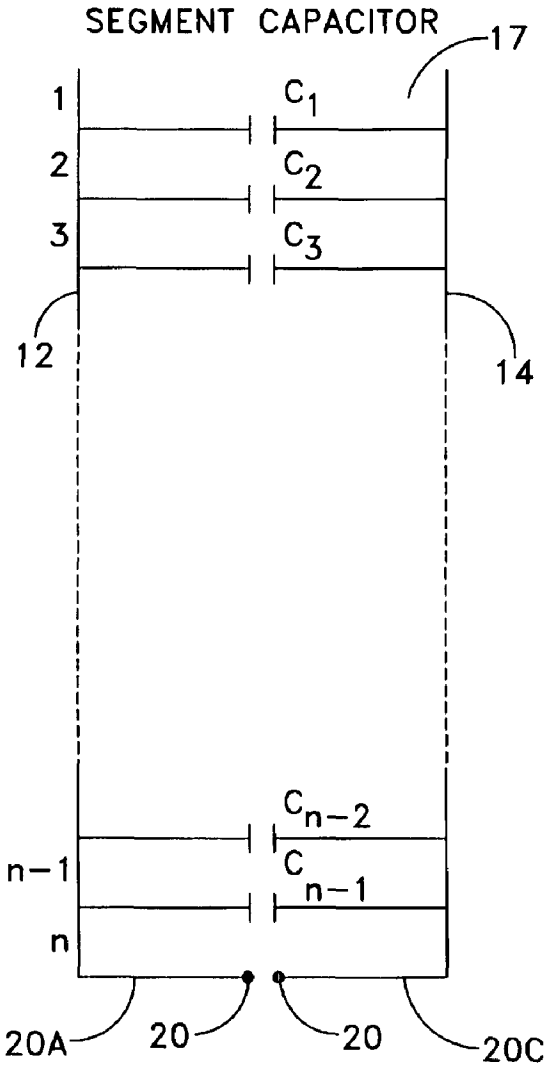
FIG. 2 is a schematic view one of a pair of antenna elements in an unwrapped state for the antenna shown in FIG. 1.

FIG. 2 depicts a pair of diametrically opposed antenna elements, specifically antenna elements 12 and 14 from FIG. 1. For clarity, the antenna elements 12 and 14 are shown in an unwound state. FIG. 2 depicts a number of capacitive elements connected between the antenna elements 12 and 14 so that n−1 capacitive elements $C_1 \ldots C_{n-1}$ divide the antenna elements 12 and 14 into n segments. The pair of antenna elements 13 and 15 include similar capacitive elements and the positions of corresponding capacitive elements in each pair will be the same.

Still referring to FIG. 2, the capacitive elements are evenly distributed along the length of the element pair until reaching the radial feed sections 20A and 20C for the antenna elements 12 and 14. The capacitors decrease in value from the unfed end 17 to the feed end 16; that is:

$$C_1 > C_2 > \ldots > C_{n-1} > C_n \quad (1)$$

With this relationship among the capacitive elements, the individual capacitors at the unfed end 17 start to short out the helix at low frequencies. As frequency increases, the capacitive elements closer to the feed point 20 start to short out the helix, thus effectively shortening the helix with frequency in a progressive fashion.

More specifically, following the principles for the frequency independent behavior with a log periodic dipole, the taper in capacitance values can be selected to vary logarithmically, so that the capacitance of a given capacitor $C_i$ is a constant multiple of the capacitance of the preceding capacitor toward the unfed side 17, $C_{i-1}$. That is, in equation form:

$$C_i = \tau C_{i-1} \quad (2)$$

where i is the capacitor number for $2 \leqq i \leqq n-1$ and $\tau$ is a constant.

Figure 3:
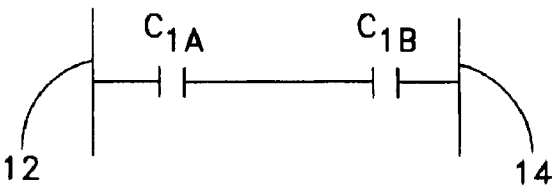
FIG. 3 is a schematic of an embodiment of this invention that produces an alternative to the antenna in FIG. 1.

In practice it has been found that it is easier to construct the antenna if each of the capacitive elements shown in FIG. 2 are formed by a pair of capacitors in series. FIG. 3 depicts the capacitive element that would replace the $C_1$ capacitor in FIG. 2 as including two capacitors, $C_{1A}$ and $C_{1B}$ in which:

$$C_{1A} = C_{1B} = 2C_1 \quad (3)$$

This facilitates the connection of two pairs of corresponding capacitive elements to the two pairs of opposed antenna elements at the same relative positions along the length of the antenna. In addition it has been found that the range of capacitance values were specified by extreme values for the $C_1$ and $C_{n-1}$ capacitors, and not by $\tau$. Rather $\tau$ was determined by the capacitance values. The extreme case occurs if the capacitor $C_1$ shorts the helix at the lowest frequency of operation, since the next few capacitors in sequence would be close to shorting out the element resulting in a partial shorting of the antenna elements even at the lowest operating frequency. Obviously, the shorting effect should only occur at higher frequencies.

At the frequencies involved with such antennas, the wires connecting the capacitors to the antenna elements and to each other have a finite series inductance that must be compensated. This compensation can be achieved by canceling the impedance with some or all of the impedance for the capacitors connected to the wires.

For example, if a connecting wire has an effective physical length of 9" and a radius of 0.2388", the wire will have an inductance of $1.633 * 10^{-7}$ Henries. At an operating frequency of 200 MHz, the required capacitance for canceling the wire impedance is 3.88 pF. Given the foregoing considerations, the value of $C_1$ must be less than 3.88 pF.

It has been found that the use of spaced capacitive shunts applied to a portion of the antenna can stabilize the pattern over a greater bandwidth that can be achieved without the capacitive shunts. As a specific example, capacitive shunts would improve an antenna having the following characteristics:

| Parameter | Value |
|---|---|
| Operating Mode | Forward fire |
| Unfed end impedance | Open |
| Input impedance | 200 ohms |
| Helix cylinder diameter | 9" |
| Cylinder length | 30.5" |
| Antenna element material | Copper |
| Antenna element diameter | 0.2388" |
| Number of segments | N = 32 |
| Frequency range | 200-400 MHz |
| Pitch angle | 40° |

Figure 4:
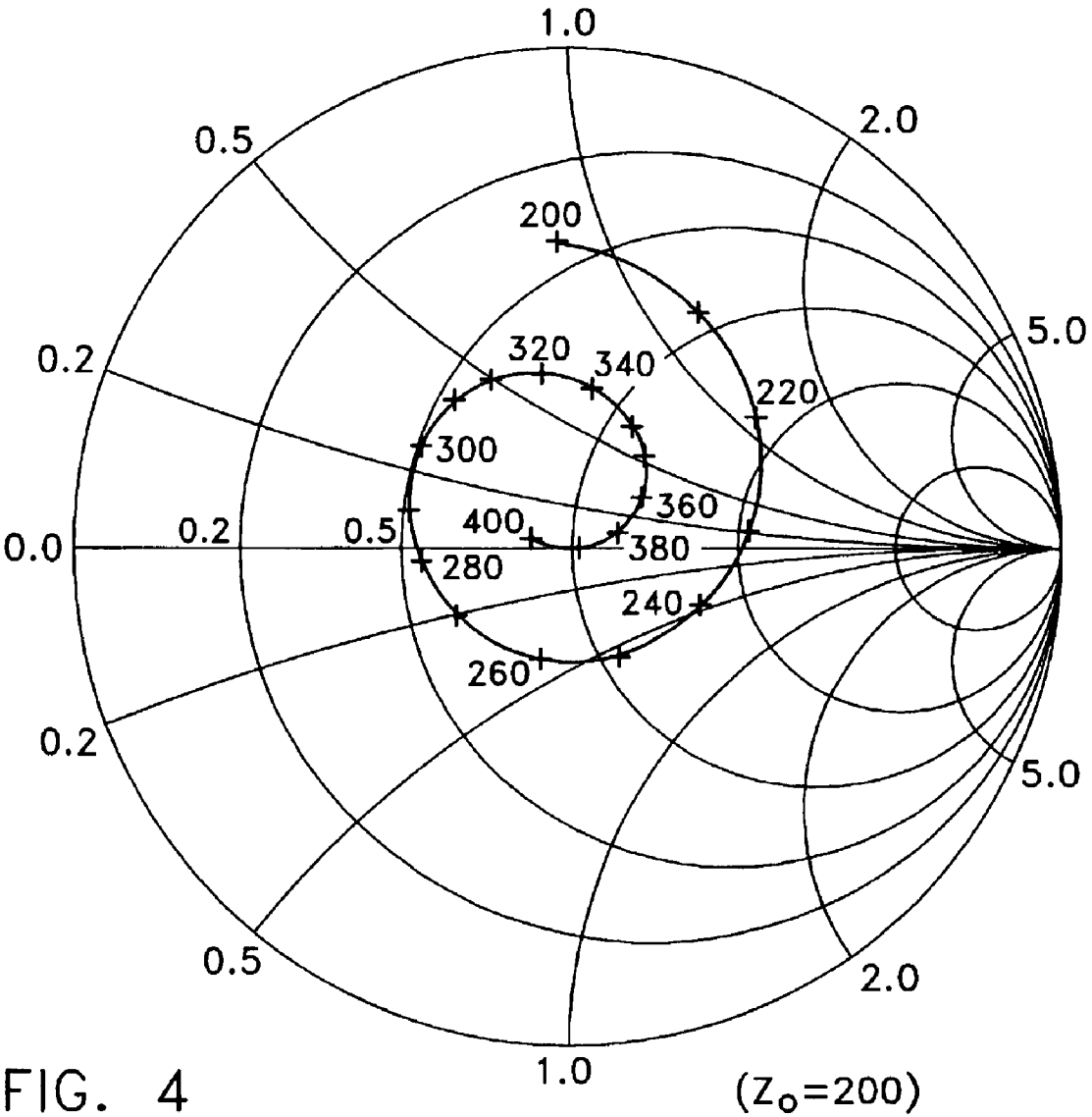
FIGS. 4 and 5 are Smith charts for depicting calculated antenna impedances.
Figure 5:
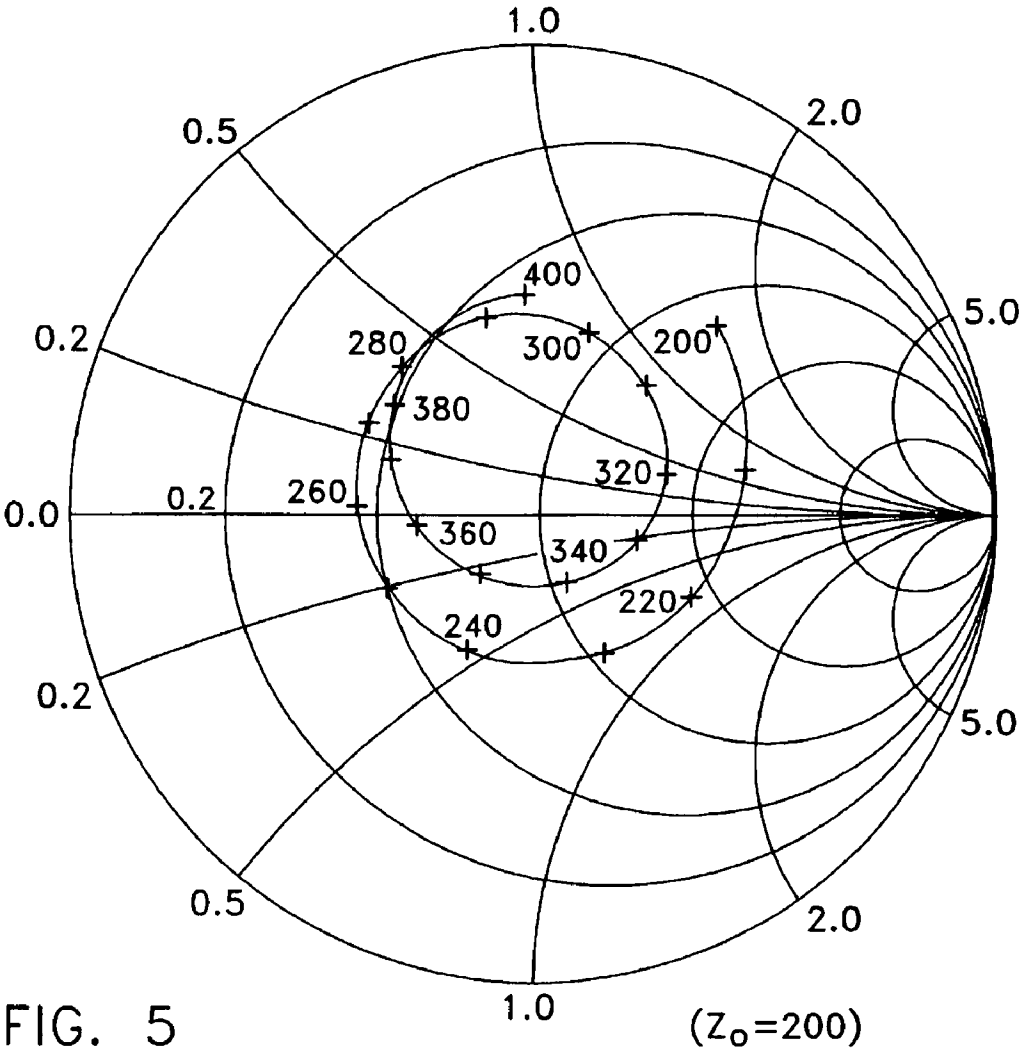

FIGS. 4 and 5 are calculated Smith charts that depict the variation of input impedance for the foregoing antenna without any shunting capacitive elements in FIG. 4 and with the addition of such shunting capacitive elements in FIG. 5 using a range of capacitors from C2=0.05 pF to C10=0.025 pF that covered about one-third of the antenna starting proximate the unfed end 17. Each Smith chart is based upon the same characteristics impedance of $Z_0$=200 ohms and shows that the impedance does not vary significantly when these capacitive shunts are added to the antenna, although FIG. 5 shows some loss of bandwidth especially at the higher frequencies.

Each of FIGS. 6A through 6L depict the patterns produced by the antenna with and without shunting capacitive elements. In each, the solid line 41 depicts the pattern for a conventional antenna; the dashed line 42, the pattern for the antenna modified in accordance with this invention. Each of FIGS. 6A through 6L is marked with the frequency for the patterns.

Figure 6B:
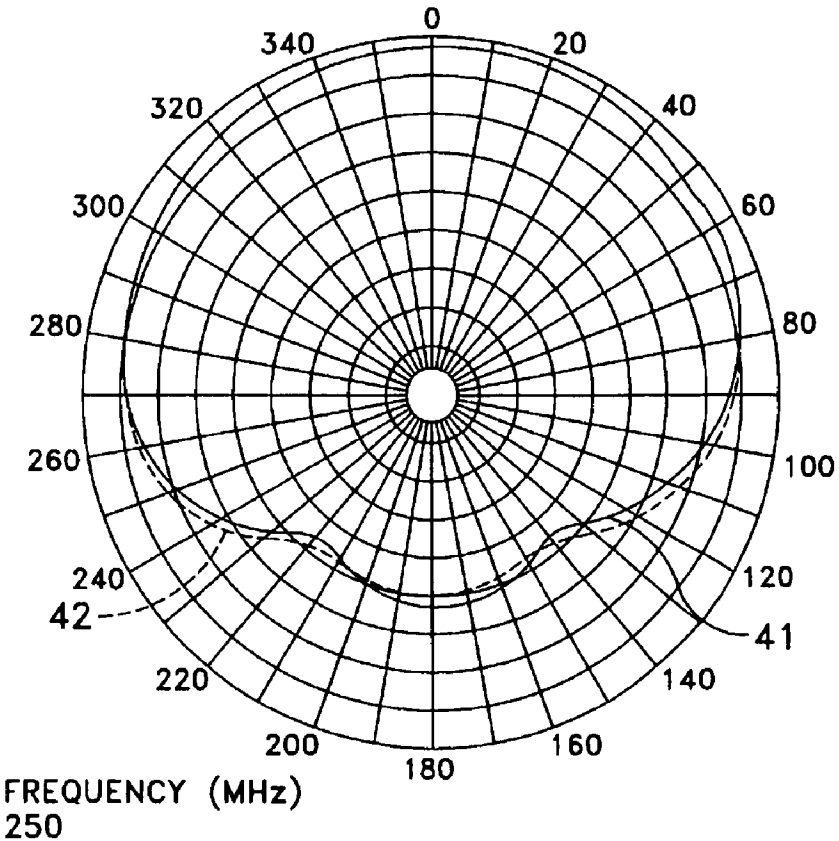
FIGS. 6A through 6L depict calculated gain comparisons of antenna performance for an antenna constructed in accordance with this invention and a standard antenna.
Figure 6A:
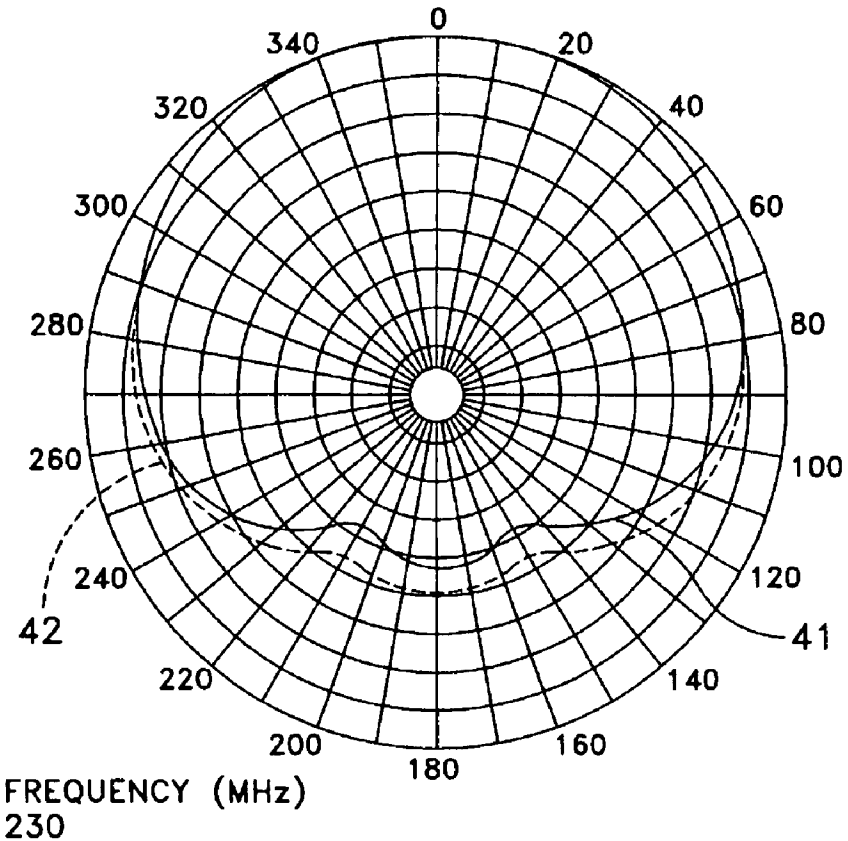
Figure 6D:
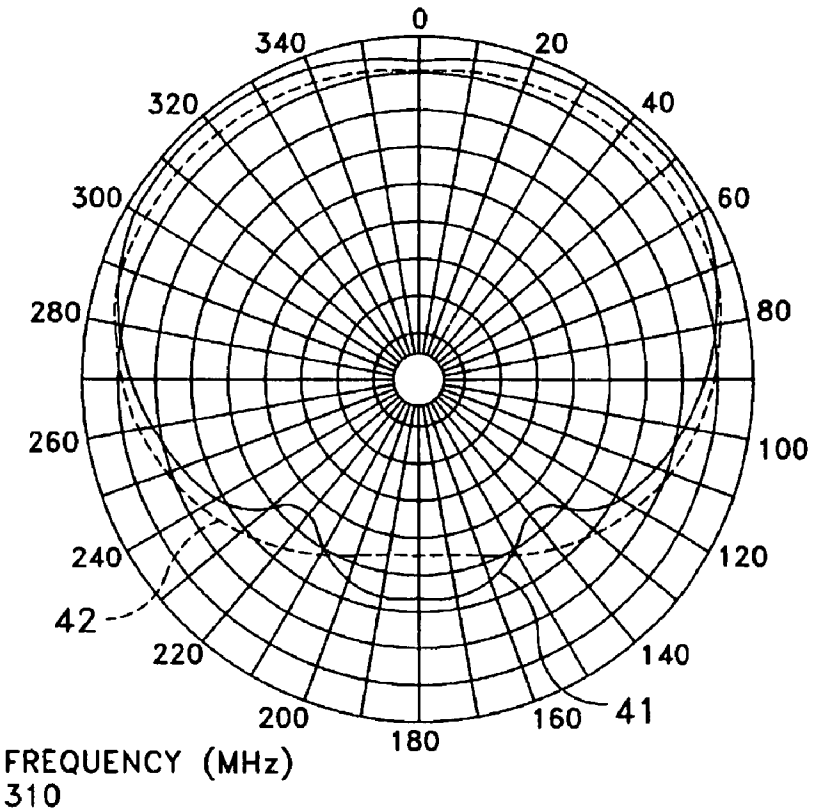
Figure 6C:
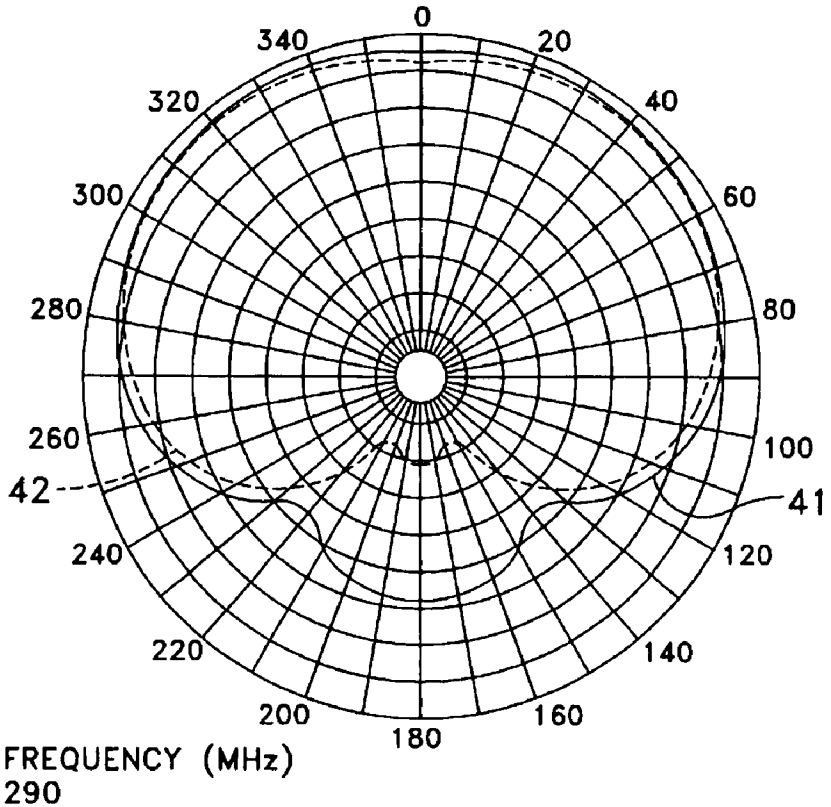
Figure 6F:
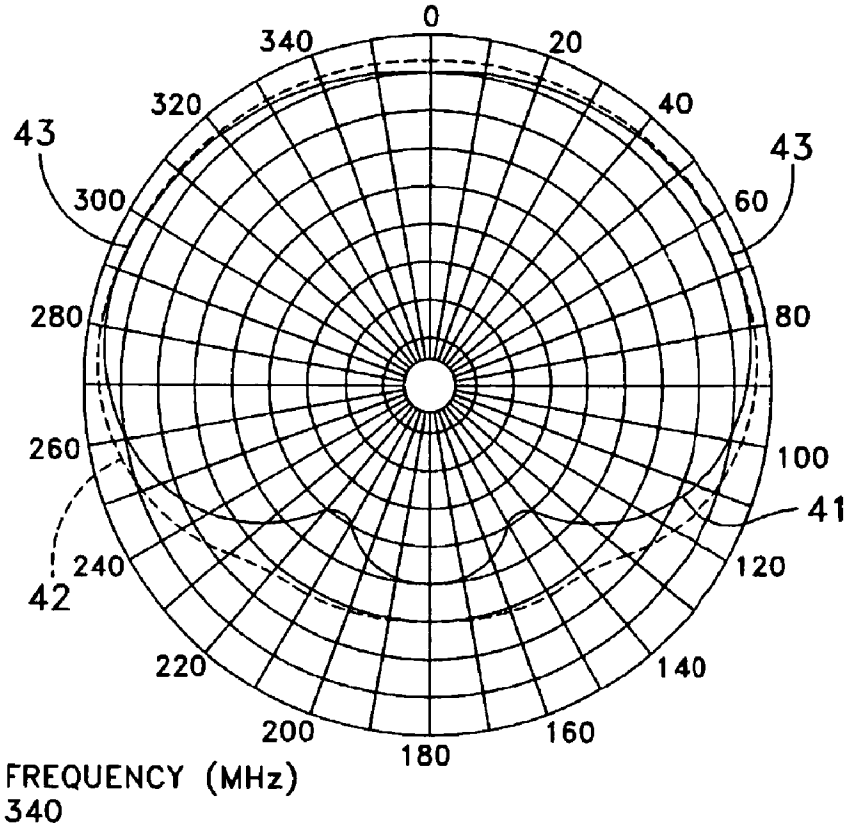
Figure 6E:
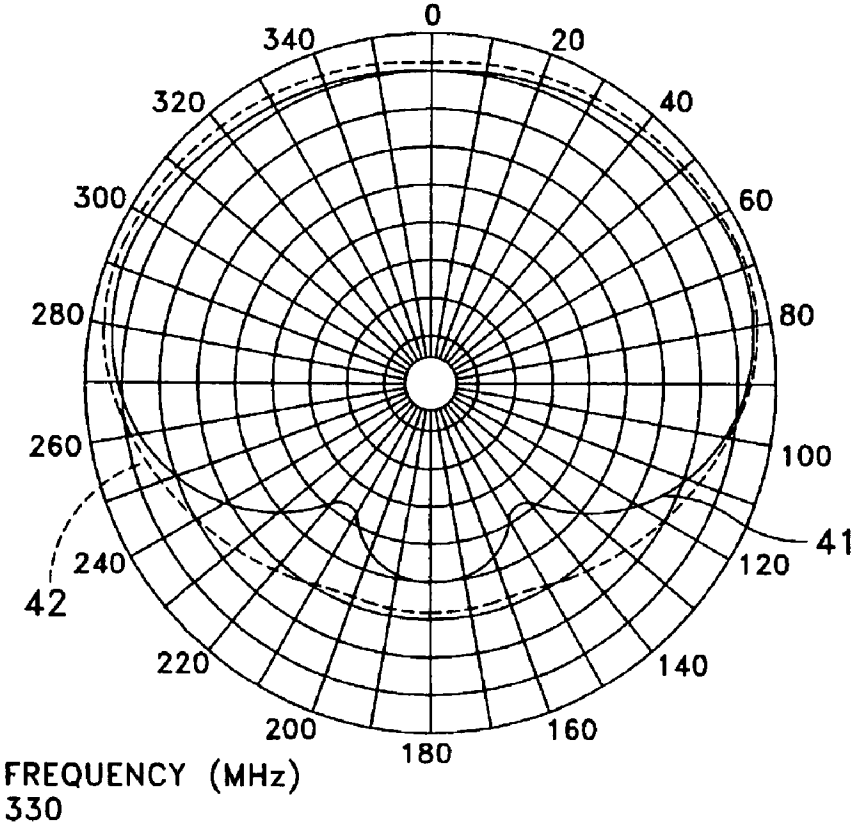
Figure 6H:
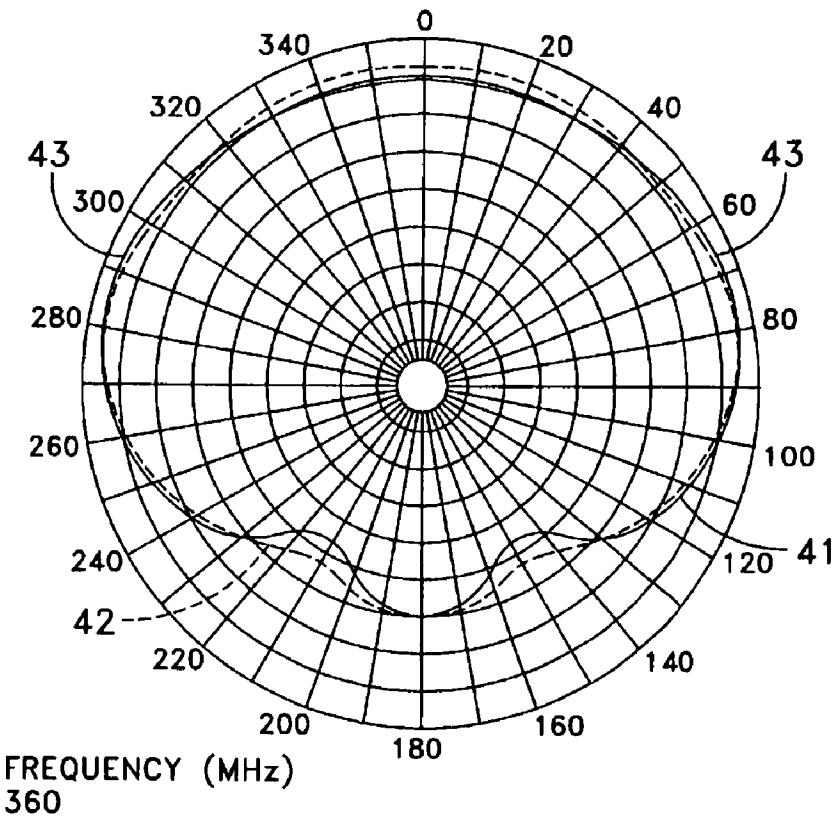
Figure 6G:
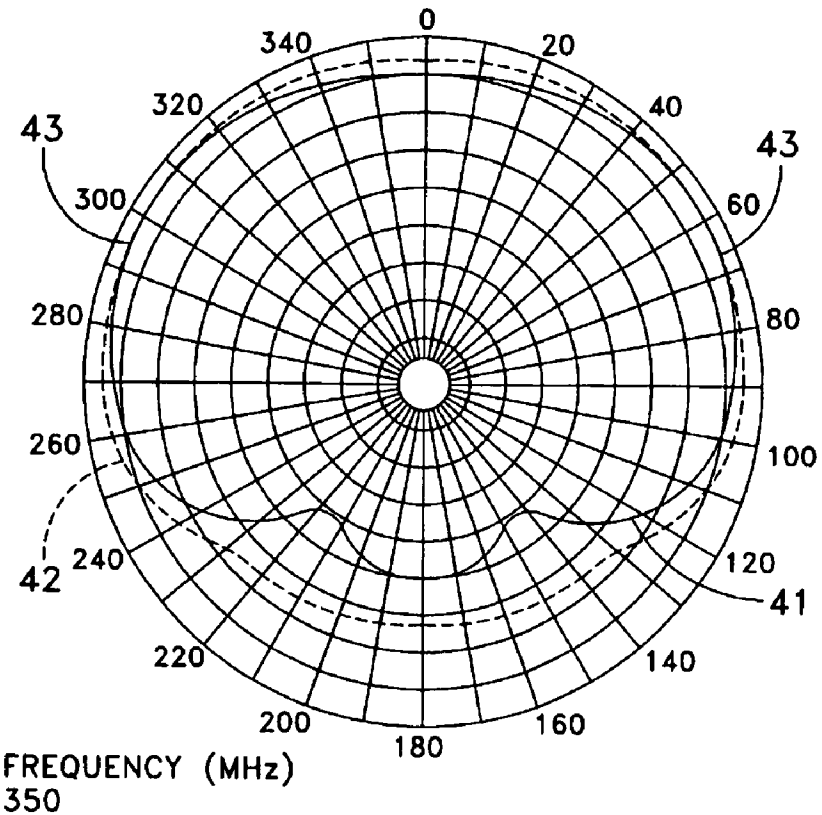
Figure 6J:
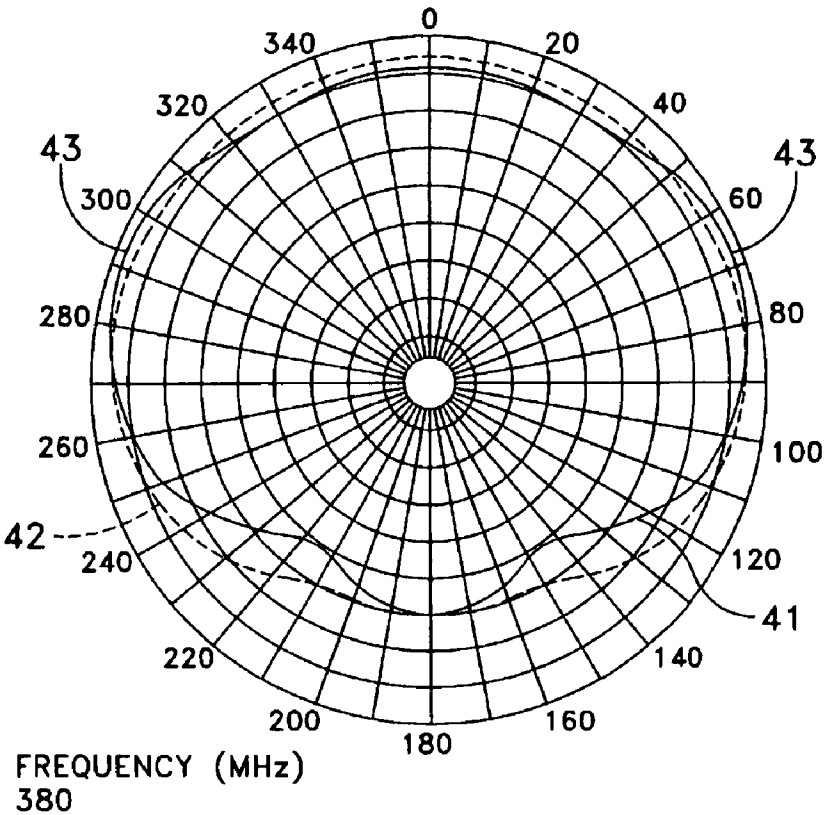
Figure 6I:
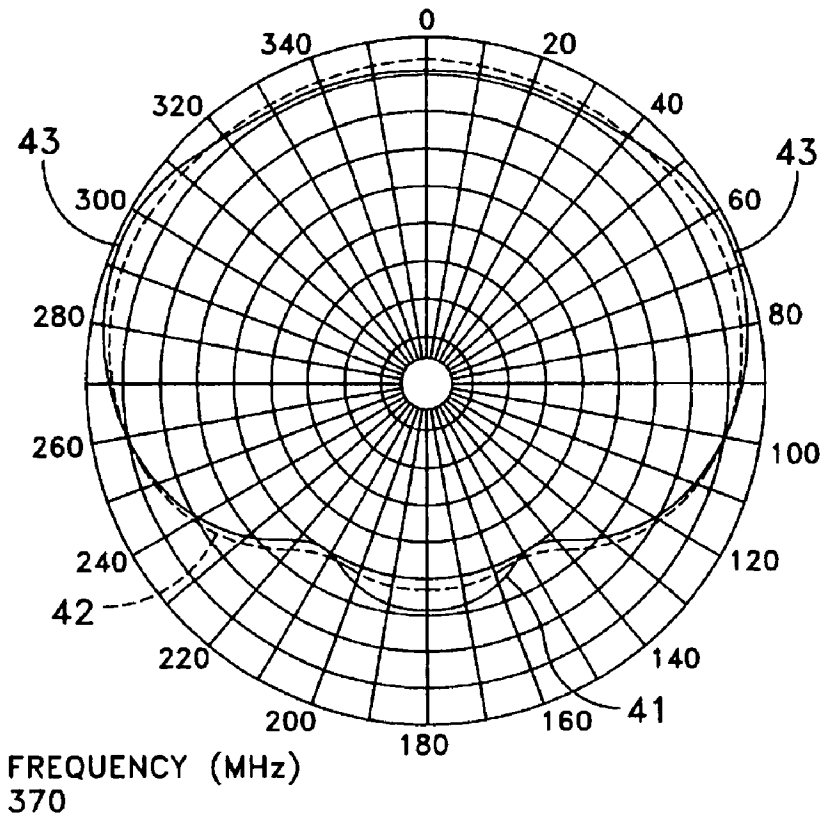
Figure 6L:
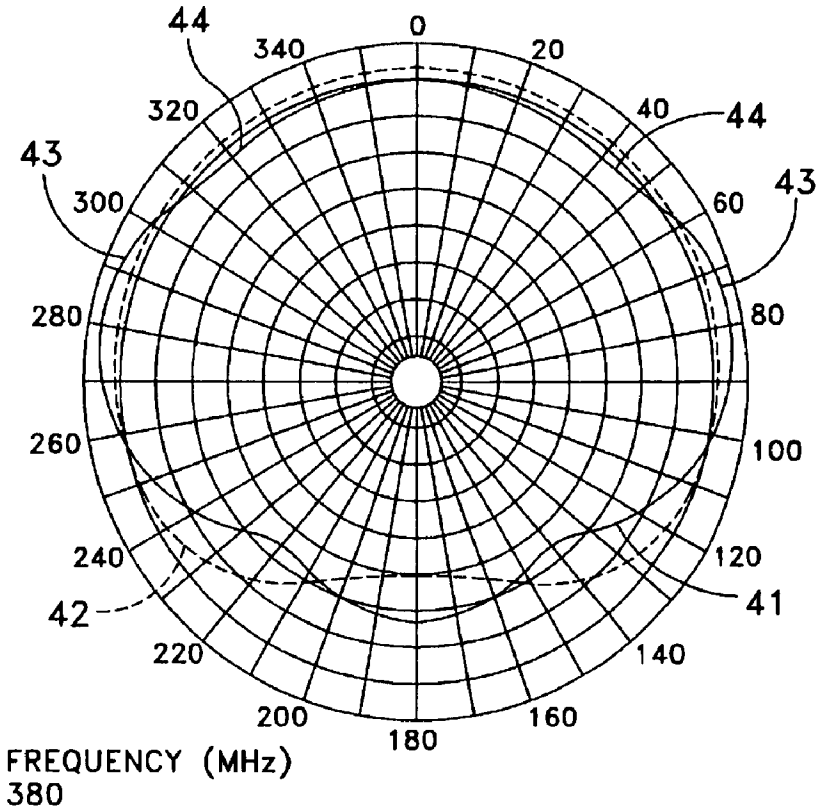
Figure 6K:
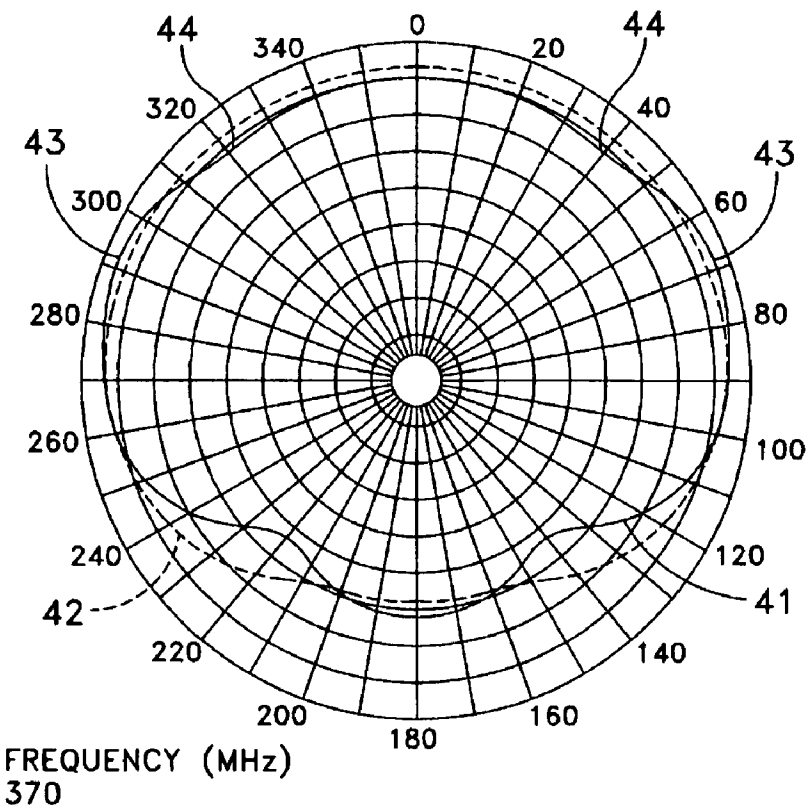

There is little difference in performance up to 330 MHz, as shown in FIGS. 6A through 6E. That is, the patterns are essentially the same and stable with respect to different frequencies. As seen in FIG. 6F, the conventional antenna begins to generate multiple lobes at 43 as the pattern 41 begins to flatten and energy dissipating horizontally begins to increase. The lobes 43 become progressively more pronounced as the frequency increases as can be seen in FIGS. 6G through 6L. That is, they are most pronounced in FIG. 6L. There is little indication of multiple lobes in patterns 42.

Below 340 MHz patterns 42 exhibit some flattening with frequency with respect to the corresponding patterns 41. However, FIGS. 6F through 6L show that this difference ceases to exist above 340 MHz. The patterns 41 in FIGS. 6K and 6L at 390 MHz and 400 MHz show the formation of nulls at 44. No such nulls appear in patterns 42 at these frequencies.

Comparing at the patterns in FIGS. 6A through 6L, it will be apparent that the shunting capacitors have stabilized the patterns 42 over those patterns 41 produced with a corresponding antenna without shunting capacitive elements. Moreover, these results are based upon an analysis of an antenna with a 40° pitch angle. Many quadrifilar helix antennas are constructed with greater pitch angles. At such greater angles, the null effect shown in FIGS. 6K and 6L will be more pronounced and would become evident at lower frequencies. Thus, such antennas would benefit to even a greater degree from the capacitive shunting of this invention. Although there is some loss of impedance matching at higher frequencies and some loss in the front-to-back ratios, the use of shunting capacitive elements will improve antenna performance where pattern stability is a major consideration.

Thus, in accordance with this invention a quadrifilar helix antenna is provided with a capacitive shunting network that electrically reduces the length of antenna elements as operating frequency increases. As a result, the energy radiates from the antenna with a pattern that is stable over a wide range of operating frequencies without the need of physical rearrangement of the antenna elements. While this antenna has been depicted in terms of a specific capacitive shunting arrangement, including spacings and relative capacitance values, it will be apparent that a number of different variations could also be included other than the structures shown in FIGS. 2 and 3. Consequently, it is the intent of the appended claims to cover all such variations and modifications as come under the true spirit and scope of this invention.

What is claimed is:

1. An antenna for operating over a range of frequencies about a cut-in frequency, said antenna extending along an antenna axis between a feed end and an other end comprising[;]:

a plurality of pairs of diametrically opposed antenna elements wrapped helically about said axis from said feed end to said other end, each of said antenna elements having a length determined by the cut-in frequency; and capacitive means spanning said antenna elements in each said pair of antenna elements *at* a predetermined position from said other end for shorting said pairs of antenna elements at a characteristic frequency greater than the cut-in frequency.

2. An antenna as recited in claim 1 wherein said antenna includes additional capacitive means spanning said antenna elements in each said pair of antenna elements at other predetermined positions along the length of said antenna axis, each of said capacitive means at different positions having a different capacitive impedance.

3. An antenna as recited in claim 2 wherein said different [capacitive means] positions are evenly spaced along said antenna axis.

4. An antenna as recited in claim 2 wherein said capacitive means most proximate to said other end has a minimum capacitance and said capacitive means most proximate to said feed end has a maximum capacitance.

5. An antenna as recited in claim 4 wherein the differences between the capacitance of adjacent capacitive means are constant.

6. An antenna as recited in claim 4 wherein the differences between the capacitance of adjacent capacitive means vary.

7. An antenna as recited in claim 6 wherein the differences between the capacitance of *the* adjacent capacitive means vary logarithmically.

8. An antenna as recited in claim 4 wherein each capacitive means includes conductors for connection to said antenna elements and said capacitance of each said capacitive means is determined by [the] *a first* capacitance required to short circuit said antenna elements at frequencies above the characteristic frequency for said capacitive means plus [the] *a second* capacitance required to compensate inductance in said conductors.

9. A quadrifilar helical antenna for operating over a frequency bandwidth defined by a minimum operating frequency and extending along an antenna axis between first and second ends thereof, said antenna comprising[;]:

four equiangularly spaced helical antenna elements extending along said axis between said first and second ends, each said antenna element having a length of at least ¾ wavelength at a minimum antenna operating frequency and having a substantially constant thickness and width, said antenna elements constituting first and second element pairs consisting of a pair of diametrically opposed antenna elements; and a plurality *of* sets of capacitive elements connected between said antenna elements in said diametrically opposed pairs, each said set being connected at a different position along the antenna axis and each capacitive element in a set connected to said respective antenna element pair at the same position along the antenna axis.

10. A quadrifilar helical antenna as recited in claim 9 wherein said antenna is divided into n axially extending segments and includes n−1 sets of axially spaced capacitive elements.

11. A quadrifilar helical antenna as recited in claim 10 wherein said antenna is divided into n axially extending segments and includes n−1 sets of evenly axially spaced capacitive elements.

12. A quadrifilar helical antenna as recited in claim 11 wherein each capacitive element has a capacitance that short circuits said antenna elements at a different frequency *of a plurality of frequencies*, *and wherein* each [of which] *frequency in the plurality of frequencies* is greater than said minimum frequency.

13. A quadrifilar helical antenna as recited in claim 12 wherein [the] *a capacitance* difference between [the capacitance in] adjacent sets *in the plurality of sets* varies.

14. A quadrifilar helical antenna as recited in claim 12 wherein [the] *a capacitance* difference between [the capacitance in] adjacent sets *in the plurality of sets* varies logarithmically.

15. A quadrifilar helical antenna as recited in claim 12 wherein each capacitance element *in the plurality of sets of capacitive elements* includes at least one capacitor and conductors extending from said *at least one* capacitor to said antenna elements, the capacitance of said capacitor being a function of the operating frequency at which said capacitance element shorts the [attached] antenna elements and the reactance of the conductors.

16. A quadrifilar helical antenna as recited in claim 15 wherein at least one [of said] capacitance [elements] *element in the plurality of sets of capacitive elements* includes first and second capacitors in series.

17. A quadrifilar helical antenna as recited in claim 16 wherein [the] *a capacitance* difference between [the capacitance in] adjacent sets *in the plurality of sets* varies.

18. A quadrifilar helical antenna as recited in claim 16 wherein [the] *a capacitance* difference between [the capacitance in] adjacent sets *in the plurality of sets* varies logarithmically.

*19. An antenna for operating over a range of frequencies about a cut-in frequency, said antenna extending along an antenna axis between a feed end and an unfed end, said antenna comprising:*

*a plurality of pairs of opposing antenna elements wrapped helically about said axis from said feed end to said unfed end, at least some of said antenna elements having a length determined, at least in part, from said cut-in frequency; and*

*a plurality of capacitors coupled between antenna elements of said pairs of opposing antenna elements at locations spanning said antenna elements, said capacitors being configured to shunt said antenna elements at a characteristic frequency greater than the cut-in frequency.*

*20. The antenna as recited in claim 19, wherein said plurality of capacitors are coupled between said antenna elements at predetermined positions along said antenna axis, and wherein said capacitors provide associated capacitive impedances.*

*21. The antenna as recited in claim 20, wherein said plurality of capacitors are connected between said antenna elements at positions evenly spaced along said antenna axis.*

*22. The antenna as recited in claim 20, wherein a first capacitor most proximate to said unfed end comprises a minimum capacitance among said plurality of capacitors, and wherein a second capacitor most proximate to said feed end comprises a maximum capacitance among said plurality of capacitors.*

*23. The antenna as recited in claim 22, wherein capacitance differences between adjacently coupled capacitors in said plurality of capacitors are constant.*

*24. The antenna as recited in claim 22 wherein capacitance differences between adjacently coupled capacitors in said plurality of capacitors of vary.*

*25. The antenna as recited in claim 24 wherein capacitance differences between adjacently coupled capacitors in said plurality of capacitors vary logarithmically.*

*26. The antenna as recited in claim 22, wherein respective capacitors in said plurality of capacitors comprise conductors for connection to said antenna elements, and wherein respective capacitances of said capacitors is determined, at least in part, by first predetermined capacitances required to short circuit said antenna elements at frequencies above the characteristic frequency for said capacitors plus second predetermined capacitances to compensate inductance in said conductors.*

*27. A broadband unidirectional hemispherical coverage radio frequency antenna, comprising:*

*a plurality of helical antenna elements having a feed end for electrically connecting the plurality of elements; and*

*a capacitor network configured to capacitively shunt respective antenna elements in a pattern varying as a function of distance from the feed end, to thereby control an apparent length of the antenna, wherein the apparent length of the antenna varies with frequency, and wherein the antenna is configured to operate with a circular polarization and to exhibit a non-unity front-to-back ratio over a range of electromagnetic frequencies.*

*28. A broadband unidirectional radio frequency antenna comprising:*

*a plurality of helically wound conductive antenna elements having a feed end; and*

*a network of shunting capacitors, capacitively coupling at least two of the conductive antenna elements, at a plurality of locations distant from the feed end, said network of shunting capacitors configured to short out an increasing number of the conductive antenna elements in the plurality of helically wound conductive antenna elements as frequency increases.*

*29. A broadband unidirectional radio frequency antenna, comprising:*

*a plurality of helically wound conductive antenna elements; and*

*a capacitive network coupling the conductive antenna elements with each other, said capacitive network configured to short out an increasing number of the conductive antenna elements in the plurality of helically wound conductive antenna elements as frequency increases.*

*30. The antenna of claim 28, wherein the antenna is circularly polarized.*

*31. The antenna of claim 28, wherein capacitance values of the network of shunting capacitors decrease in value from an unfed end of the antenna elements to the feed end of the antenna elements.*

*32. The antenna of claim 31, wherein the capacitance values vary logarithmically.*

*33. The antenna of claim 29, wherein the antenna is circularly polarized, and wherein the antenna has a unidirectional pattern, having a bandwidth of at least 200 MHz.*

*34. The antenna of claim 29, wherein capacitance values of capacitors in the capacitive network decrease in value from an unfed end of the antenna elements to a feed end of the antenna elements.*

*35. The antenna of claim 34, wherein the capacitance values vary logarithmically.*

* * * * *

UNITED STATES PATENT AND TRADEMARK OFFICE

CERTIFICATE OF CORRECTION

PATENT NO. : RE42,533 E
APPLICATION NO. : 11/491534
DATED : July 12, 2011
INVENTOR(S) : Josypenko It is certified that error appears in the above-identified patent and that said Letters Patent is hereby corrected as shown below:

Title page, item (54), under "Title", in Column 1, Line 1, delete "CAPACITATIVELY" and insert -- CAPACITIVELY --.

Title page, item (57), under "Abstract", in Column 2, Line 1, delete "feedpoint" and insert -- feed point --.

Column 1, line 1, delete "CAPACITATIVELY" and insert -- CAPACITIVELY --.

Signed and Sealed this
Third Day of January, 2012

David J. Kappos

David J. Kappos
*Director of the United States Patent and Trademark Office*